3,473,950
HIGH STRENGTH FIBROUS GLASS
Robert Wong, Newark, Ohio, assignor to Owens-Corning Fiberglas Corporation, a corporation of Delaware
Continuation-in-part of application Ser. No. 300,511, Aug. 7, 1963. This application July 25, 1967, Ser. No. 655,874
Int. Cl. C03b *37/02;* B44d *1/14*
U.S. Cl. 117—66                                              25 Claims

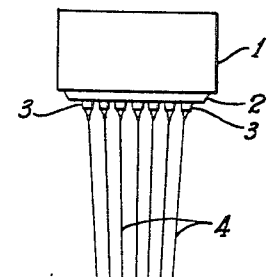
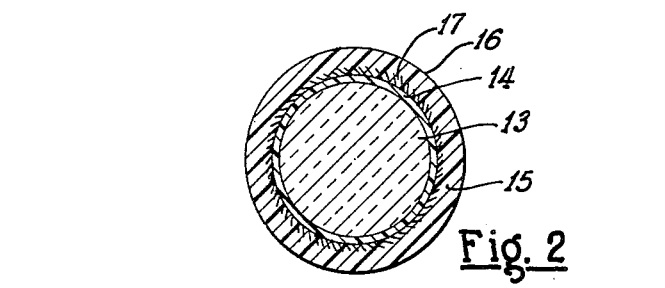
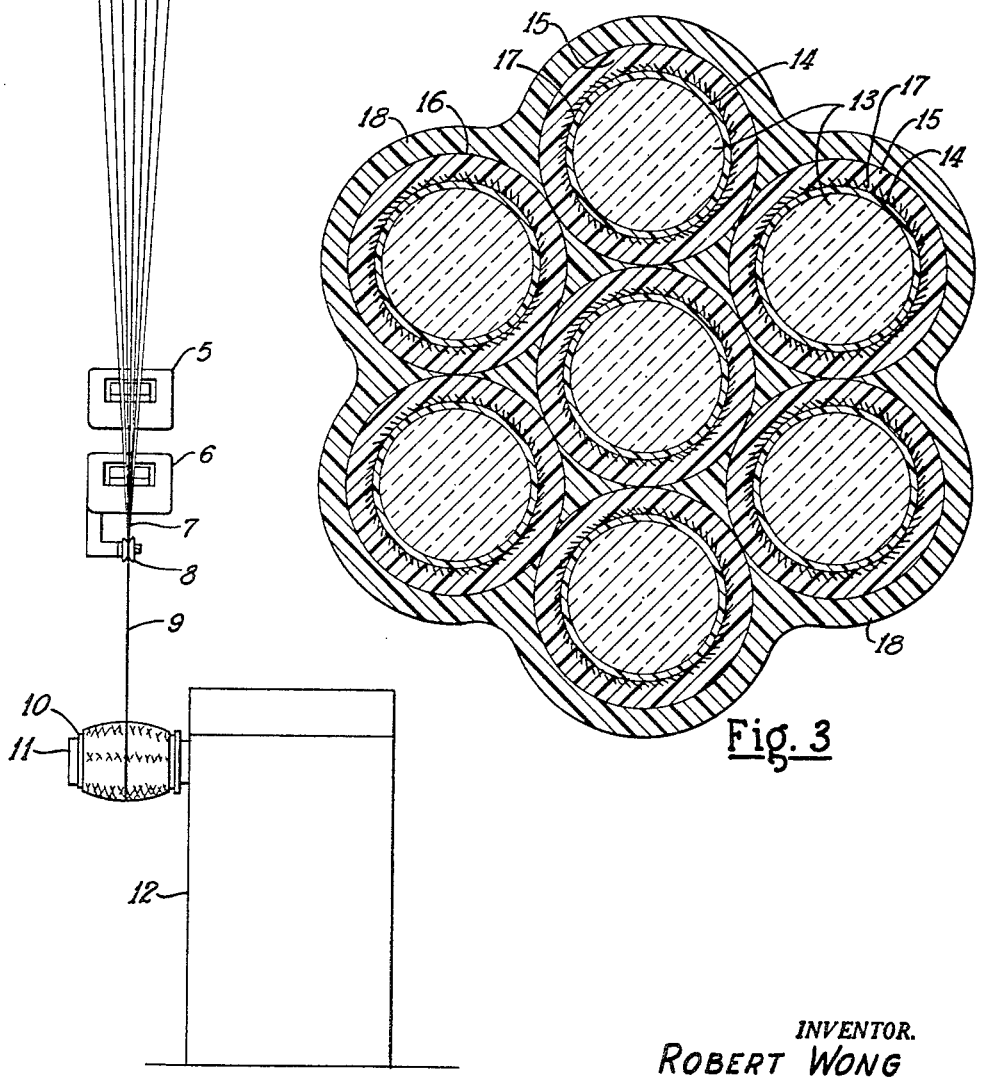

ABSTRACT OF THE DISCLOSURE

Method for sizing glass fibers comprising coating fibers immediately after attenuation with a solution in a polar organic solvent of (a) a polar organosilane $R_4Si$ where at least one R is an organic group bearing an oxirane ring or a curing agent for oxirane rings, and the remaining R's are hydroxyl radicals or hydrolyzable radicals, and (b) a reactable epoxy resin in an amount greater than that which can be reacted with the polar organosilane; and winding the fibers into a coiled package for subsequent combination with epoxy resins.

Cross-references to related applications

This appliaction is a continuation-in-part of copending application, Ser. No. 300,511, filed Aug. 7, 1963, now abandoned which in turn is a continuation-in-part of copending application, Ser. No. 37,317, filed June 20, 1960, now abandoned, and of copending application, Ser. No. 77,846, filed Dec. 23, 1960, now abandoned.

Background of the invention

The glass fibers which have been produced commercially heretofore have never had strength approaching the theoretical strength of glass, and the reasons for this have not been known. Glass fibers which are produced commercially have a diameter usually less than approximately 0.00025 inch, so that the strength of these fibers can be significantly affected by surface defects of a very minute nature. Because glass is so greatly affiected by scratches and other surface defects, and because these defects on glass fibers can be so very minute, the art has heretofore been unable to ascertain the reasons why commercially produced fibers did not have strengths closer to the high theoretical strength of glass. Since applicant has discovered a procedure whereby strands of glass fibers can be made which have strength close to the theoretical strength of glass, it is now possible to understand the significance of applicant's procedure, and to diagnose the conditions necessary to produce strands of fibers having strength close to theoretical.

The prior art has known that it is necessary to coat the individual filaments immediately after forming with a protective coating which will lubricate and separate the fibers. The prior art has used an infinite variety of starches, silanes, and plastic materials as coatings and has applied these materials to the fibers both from water solutions and from organic solutions. The prior art, up until the present invention, was not able to obtain fibers which were appreciably stronger when coated with organic solutions of film formers than when coated with aqueous solutions of film formers. Because no appreciable benefit had been observed heretofore from the use of organic solutions, the prior art has extensively used aqueous solutions and emulsions as coating materials for fibers at forming, since the aqueous solutions have less explosion hazard connected therewith. The prior art was not aware of degradation of the glass fibers by the water content of the aqueous solution or emulsions.

The prior art had used organosilane coupling agents in conjunction with various film forming materials both in the form of aqueous solutions or dispersions, and in the form of organic solutions. Here again, the prior art had known that a benefit was derived by using an organosilane coupling agent, but it had not discovered that any appreciable advantage could exist by using a polar organic solvent in conjunction with certain other materials in the absence of free water.

Summary of the invention

According to the invention, it has now been discovered that strands of glass fibers having close to theoretical strength can be produced provided the fibers are coated with an epoxy resin that is dissolved in a polar organic solvent that is devoid of free water, and which solution also contains an organosilane coupling agent, the organo portion of which is polar. It has been found that the epoxy resin should preferably be present in an amount greater than that which can react with the polar organo groups of the organosilane.

From the discovery of the conditions stated above, and which have been found to be necessary, it has become clear that the present invention prevents free water or moisture, as opposed to chemisorbed moisture, from contacting the surface of the fiber, and that moisture attack has a degrading effect upon the strength of the fibers. It further appears that the film laid down by the present invention is so complete and so uniform as to substantially reduce or eliminate mutual abrasion between the fibers.

The principal object of the invention, therefore, is the provision of strands of glass fibers the strength of which approach the theoretical strength of glass.

A further object of the invention is the provision of strands of glass fibers having high strength and which are completely compatible with and are easily wet out by impregnating resins which the glass fibers are intended to reinforce.

Further objects and advantages of the invention will become apparent to those skilled in the art to which it relates from the following description of the preferred embodiments described with reference to the accompanying drawing.

Brief description of the drawings

FIG. 1 is a view in elevation with parts broken away to show details, of apparatus for melting glass, flowing streams of the molten glass, attenuating the streams of the filaments and simultaneously coating said filaments in a two step process, gathering a plurality of the filaments into a strand, and winding the strand upon a forming tube.

FIG. 2 is a cross sectional view of a glass fiber treated according to the invention.

FIG. 3 is a cross sectional view of an element of a fiber reinforced molding preform.

Description of the preferred embodiments

As previously indicated, the procedures of the present invention provide a particularly beneficial orientation of the molecules of a coating material upon the surface of glass fibers. The glass fibers must be coated immediately upon forming to preclude free moisture or water, as opposed to chemisorbed moisture, from reaching the surface of the glass fibers, and the particular orientation of molecules that are laid down by the present invention thereafter prevents moisture from the air or surrounding environment from degrading the surface of the glass fibers. It has been found that the prior art random orientation of the molecules of coating materials will not assure that all portions of fibers are adequately protected from moisture attack and/or mutual abrasion. It will be understood that the strength of any organic material used to hold the fibers of a strand together is so much less than that of the glass fibers that a break anywhere along the length of a fiber will produce a substantially proportional decrease in the strength of the strand. It will be appreciated, therefore, that the uniformity of the coating of the individual strands is of the utmost importance.

The molecular arrangement of the invention is produced by coating the individual monofilaments of glass, immediately upon forming, with an organic solution, devoid of free water, of a polar organic solvent and a polar organic silane of the general formula $R_4Si$ wherein at least one R is a functional polar organo radical having an oxirane group or a group reactive with a curing agent for an oxirane group. The remaining R groups must either be hydroxy radicals or hydrolyzable radicals. Molecules of an epoxy resin must also surround the functional organo radicals. This can be accomplished either by making the epoxy resin an intimate part of the organic solution, or by applying a separate solution of the epoxy resin in a polar organic solvent over the top of the first mentioned solution. The amount of the epoxy resin, which is an intimate part of the first solution or which is applied by means of the second solution, must be greater than can react directly with the functional polar groups of the organosilane.

The procedures of the present invention provide optimum conditions for producing a particular alignment of the molecules on the surface of the fibers which will now be described. It is known that the surface of glass after initially produced, will absorb water to form hydroxyl groups which, because of their polar nature and/or slight ionization cause the surface to be negatively charged. The organosilianes which applicant has found effective are those having organic radicals containing a polar functional group which is negatively charged. The groups which have been found particularly effective are oxirane groups and amine groups both of which are polar, and both of which are negatively charged. Because of the different result which is obtained when a nonpolar solvent is used, it is clear that the polar solvent surrounds the polar organic group to neutralize its charge to thereby prevent this end of the molecule from being attracted to the surface of the glass. By neutralizing the charge of the organic portion of the silane molecule, the silicon atom having a hydroxyl or hydrolyzable group thereon is thereby free to in all instances approach the surface of glass to produce what is believed to be an SiO Si bond to the glass. An orderly arrangement of the molecules is thereby provided wherein the silicon atom is attached to the surface of the glass with the organo portion projecting away from the glass.

It will be apparent that the same result is not achieved when the organo portion is dissolved in a nonpolar solvent, because the nonpolar solvent will permit both ends of the organosilane to lay against the surface of the glass, or will permit the organo portion to attach to the surface of the glass with the silane portion projecting away from the glass. It has further been found that an excess of epoxy resin, over and above that which will react directly with the organo polar group of the silane, is necessary in order that the organo polar groups will be completely surrounded by the epoxy resin to thereby preclude voids from forming which will allow moisture to reach the surface of the fibers and/or preclude the surface of the fibers from becoming scratched. The molecules of the epoxy resin must also be dispersed in a polar solvent in order that the molecules of the epoxy resin adequately solvate the organo portion of the silane molecules.

It is further believed that the polar solvent molecules "blank off" the polar group of the epoxy resin to permit their random orientation around the organo functional group of the silane. Upon subsequent reaction of the resin, therefore, the epoxy not only properly reacts with the organo functional group, but cross links with other epoxy groups to provide a good three dimensional resin linking.

While the resins employed are epoxy resins generally including cyclohexene oxides, the preferred resins may be defined as the reaction products of epichlorohydrin and phenols or as polymers having terminal oxirane groups, and some selectivity may be exercised in the determination of the particular resin to be utilized. For example, those resins characterized by relatively low molecular weights and/or outstanding abrasion resistance are preferred. It has been found that better wet out is often achieved with those resins which have a lower molecular weight. In addition, the solubility characteristics of a resin in a particular solvent may be a determining factor. The general applicability of epoxy resins is demonstrated by the fact that a variety of commercial epoxy preparations such as Ciba's Araldite 6005 and Araldite 6071 epoxy resins, Dow Epoxy DEN 438 novolac epoxy resin, and Shell's Epon 828 have been successfully employed in the conduct of the invention. It should further be noted that in a preferred embodiment, the epoxy resins are utilized in a liquid form and in an uncatalyzed or hardening agent free condition.

Araldite 6005 is a liquid epoxy having an epoxy value (equivalent/100 g. resin) of 0.52, an epoxy equivalent (grams resin g.-mol. epoxide) of 192, a specific gravity of 1.16, a Gardner color of 2, and a Brookfield viscosity at 25° C. of 9,500 c.p.s., while Araldite 6071 is a solid epoxy resin having a melting point of 70° C., an epoxy value of 0.205, an epoxy equivalent of 485, an esterification equivalent of 130, a specific gravity of 1.21, a Gardner color of 4 and a Gardner-Holdt viscosity (at 25° C.) of E. Epon 828 is also a liquid epoxy resin which has a Gardner color of 5, a viscosity at 25° C. of 100–160 poises, an epoxide equivalent of 180–195 and an esterification value of 85.

The non-aqueous polar solvents utilized must contain electronegative atoms, and preferably those whose electronegative atoms are oxygen. Volatility and flash points of the solvents are not a restriction since appropriate exhaust and shielding systems may be used to prevent the ignition of solvent fumes by the high temperature fiber-forming bushing and the molten glass. When solvents of high volatility and exhaust systems are used, conventional solvent recovery apparatus may also be employed. However, to reduce the hazards involved, solvents exhibiting low volatility and high flash points such as acetone free diacetone alcohol are preferred. Another consideration in the selection of the solvent is the degree of reactivity between the resin and solvent and substantially nonreactive solvents are preferred. While diacetone alcohol is a preferred solvent, other alcohols, ketones, and/or ethers, such as acetone, methyl isobutyl ketone, the cellosolves and the cellosolve acetates may also be used.

The organosilane may be more properly defined as a silane having one or more alkyl, aryl, arylalkyl or alklaryl group thereon which group includes a functional radical which contains an oxirane ring or that is reactive with a curing agent for an oxirane ring. Organosilicon compounds which are characterized by at least one organo group that includes an amino, epoxy, hydroxyl, or thiol radical are suitable. Suitable groups include: gamma amino propyl, N methyl gamma amino propyl, N phenyl gamma amino propyl, NN methyl gamma amino propyl, N alkylgamma amino propyl, N-beta (aminoethyl) gamma amino propyl, amino phenyl such as m-amino phenyl, the acrylic salt of N-beta (amino ethyl) gamma amino propyl, gamma methacryloxy, propyl, gamma glycidoxy propyl, beta (3,4 epoxy cyclohexyl) ethyl, beta (3,4 epoxy 4 methyl cyclohexyl) ethyl, 2 propyl-9,10 epoxystearate, copolymer of 1 part vinyl silane and 2 parts glycidyl methacrylate, copolymer of 2 parts vinyl silane and 1 part glycidyl methacrylate, 2:1 vinyl silane and "Oxiron 2001 copolymer, gamma (2 hydroxyl phenyl) propyl, gamma (4 hydroxyl phenyl) propyl, formal derivative of gamma (3,4 dehydroxy phenyl) propyl, gamma hydroxyl propyl, gamma thiol propyl, amino biphenyl, benzimadzole substituted groups, alkyl cycloakyl epoxides, cycloalkyl alkyl epoxides, alkyl epoxides, alkyl aryl epoxides, aryl alkyl epoxides, etc.

Such organo silicon compounds may be represented by the formula $R_4Si$ in which at least one R group is an organo group having a functional radical from the group consisting of an oxirane ring and groups that are reactive with an oxirane ring, and the remaining R groups are hydroxyl and/or hydrolyzable groups including alkyl amino, alkyl, halogen, alkoxy, substituted alkoxy, aryl, alkaryl, aroxyalkyl, or alkoxyaryl groups including substituted members of these groups. It should be noted that the organosilanes with hydrolyzable groups, e.g. haolgen, alkoxy, etc., may be employed, although in a preferred practice such groups are hydrolyzed prior to combination with the epoxy resin or application to the glass surface. As a consequence the preferred type of organosilane, as actually added to the size composition, possess the formula $R_4Si(OH)_{4-n}$ in which R is an organo group of the above described type and n is an integer having a value of from 1 to 3.

Such hydrolyzed silanes are readily prepared by mixing the selected silane and organic polar solvent, preferably in a weight ratio of 1:9, adding water, mixing, and allowing the mixture to stand overnight. The hydrolysis of typical amino silanes is illustrated by the following equations which involve the reactions of gamma amino propyl triethoxy silane, and N beta ethyl amine gamma amino propyl triethoxy silane:

(1)

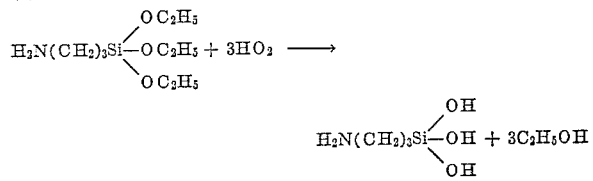

(2)

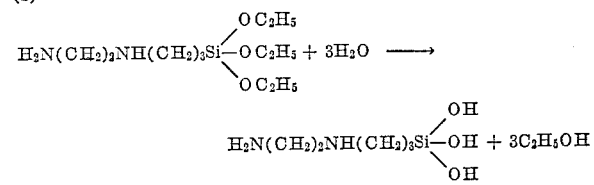

It should be noted that the above reactions are theoretical to the extent that the hydrolysis of the aminosilanes may be followed by condensation through the —Si—OH groups with water split off to yield —Si—O—Si— linkages.

It is further noted that the addition of a small percentage of a nonhydrolyzed organo silane such as gamma amino propyl triethoxy silane improves the operation in some applications, although the material is not necessary for successful performance.

An interesting and unusual characteristic of the size compositions of the present invention is their independence of lubricants. While conventional size compositions require the incorporation of such materials, it has been found that the compositions of the invention impart or exhibit adequate lubricity and freedom from attrition without the addition of lubricants. However, if a particularly high degree of lubricity is desired, conventional forming size lubricants such as amine acetate salts, animal and vegetable oils, the condensates of amines and fatty acids such as octadecyl amine acetate, the sodium salts of propionic acid and polyethylene glycols and their esters may be added. In the utilization of such lubricants, care should be taken to select compounds which will not exert a curing effect upon the resinous component of the size composition, to the end that the achievement of a surface portion of uncured resin is precluded. Silicone lubricants of low or intermediate molecular weight and devoid of hydrolyzable groups are particularly useful.

The basic components of the forming size compositions of the present invention are preferably employed in the following proportional ranges, expressed in percentages by weight:

| | Percent |
|---|---|
| Epoxy resin | 1.5–30 |
| Non-aqueous polar solvent | 60–98.5 |
| Polar organosilane | 0.1–5.0 |
| Lubricant | 0–5.0 |

Examples 1–4 demonstrate the practice of the invention, using aminosilane and epoxy resin.

Example 1

| | Percent |
|---|---|
| Epoxy resin (Araldite 6005) | 10 |
| Gamma amino propyl triethoxy silane | 0.66 |
| Diacetone alcohol | 89.33 |

Example 2

| | |
|---|---|
| Epoxy resin (Araldite 6071) | 15 |
| Gamma amino propyl triethoxy silane | 1 |
| Diacetone alcohol | 84 |

Example 3

| | |
|---|---|
| Epoxy resin A (Araldite 6005) | 7.5 |
| Epoxy resin B (Araldite 6071) | 7.5 |
| Gamma amino propyl triethoxy silane | 1.0 |
| Polyethylene glycol monostearate | 1.5 |
| Diacetone alcohol | 82.5 |

Example 4

| | |
|---|---|
| Epoxy resin (Epon 828) | 15 |
| Gamma amino propyl triethoxysilane | 2.0 |
| Diacetone alcohol | 83 |

In addition, the proportional ranges expressed in regard to the resin and solvent are not restrictive since they are employed only as a method of viscosity control adapted to the performance of the selected applicator apparatus and the viscosity of the resin. When apparatus which permits rapid dissemination of viscous materials is employed, the proportion of the solvent utilized may be reduced and vice versa. Similarly, less viscous resins require a lesser amount of solvent. The ranges are established merely to indicate the solvent resin proportion preferred when Araldite 6005 epoxy resin is used with a conventional roller applicator.

FIG. 1 illustrates the use of the methods and apparatus of the invention in conjunction with conventional glass fiber drawing or attenuating apparatus wherein a bushing 1 in which a glass batch composition or preformed glass marbles are heated to a molten state is provided with a tip section 2 which has a plurality of tips 3 provided with orifices through which the molten glass flows to be attenuated into filaments 4 which are drawn across the surface of an aminosilane curing agent applicator 5 and a resin applicator 6. The coated filaments 7 are then gathered by means of a guide 8 into a strand 9 and subsequently wound upon a forming tube 10 which is mounted upon a collet 11 journaled to a housing 12 which contains the winder-attenuator drive means. In the conduct of Examples 1–4 only the first applicator 5 was employed since the aminosilane and epoxy resin were applied in admixture.

Using the illustrated apparatus glass fibers may be drawn at rates ranging up to 40,000 feet per minute. However, due to practical apparatus efficiencies, the fibers are normally drawn in the range of 3,000 to 15,000 feet per minute with an average drawing rate in excess of one mile per minute. Since convenience dictates that the collet 11 be located a distance of from 3 to 10 feet from the bushing tips 3, it may be seen that the time allotted for the passage of a given point on the filaments from the applicator apparatus 5 and 6 to the collet 11, where the filament is in abrasive contact with previously and subsequently wound turns of the filament, ranges between .018 and .08 second. Thus it may be observed that the time allowed for curing of the resinous coating between the point of application and such time as harmful abrasive conditions are encountered, is extremely limited.

The size compositions of the above examples may be applied to a plurality of glass fibers during forming and at conventional forming speeds by means of conventional applicators such as a pad type applicator as shown in U.S. 2,390,370 and 2,778,764, a roller as disclosed by U.S. 2,693,429 and 2,742,737 and FIG. 1, or even by spray or immersion applicators. By such means, a quantity of the size composition ranging between 0.5 and 15 percent by weight of the fiber-coating composite is applied to the fibers.

The wound packages which were yielded did not exhibit a blocking tendency and the coated strands could be readily unwound. Such packages exhibited similar characteristics immediately after forming, after prolonged standing with attendant air drying, and after oven curing.

The coated strands also exhibited the ability to be rapidly wet out by both polyester and epoxy resins.

The strengths of the coated strands were also greatly increased over the strengths of conventionally sized strands. For example, glass fibers sized with a conventional aqueous resin based size possess tensile strengths in the range of 200,000 to 325,000 pounds per square inch while the fibers of the invention exhibited tensile strengths ranging between 400,000 and 500,000 pounds per square inch.

Further evidence of the strength improvements achieved with the methods and materials of the invention is provided by Table 1, below:

TABLE 1

| Size Compositions Employed | Flexural Strength, Lbs./Sq. Inch | Ignition Loss, percent by Weight | Average Rod Diameter (Inches) |
|---|---|---|---|
| Aqueous dispersion of polyester resin, sample: | | | |
| A | 203,000 | 17.8 | 0.093 |
| B | 181,800 | 16.7 | 0.092 |
| Average | 192,400 | 17.3 | 0.093 |
| Solution of epoxy resin (Composition of Example 1), sample: | | | |
| C | 253,200 | 17.6 | 0.087 |
| D | 255,300 | 16.1 | 0.086 |
| Average | 254,200 | 16.9 | 0.086 |

The data embodied in the above table was achieved by ASTM D790–497 wherein glass fiber reinforced rods are prepared and flexural strengths determined for the rods. Sample A and B comprised resinous rods reinforced with fibers sized with a conventional size composition comprising an aqueous dispersion of a polyester resin, an amino silane coupling agent and a lubricant as disclosed by U.S. 2,931,739. The fibers utilized in Samples C and D were sized with the epoxy aminosilane solution of Example 1. The resin impregnant employed to form all of the test rod samples comprised 25 percent by weight of Epon 828 epoxy resin, 71.5 percent acetone and 3.5 percent of an epoxy hardener. The epoxy resin impregnant comprised approximately 25 percent of the weight of the dried and cured rods.

It is apparent from the above data that the fibers of the invention demonstrate a 32 percent improvement in flexural strength over fibers sized with a conventional resin based size composition.

A further significant characteristic of the fibers and fibrous products of the invention is their desirability in weaving applications. Fuzz level or fiber breaks are prime indicators of weavability and fabrics woven from the yarns treated in accordance with the invention exhibit an amazingly low fuzz index and excellent handleability and durability. This is merely a reflection of the protective qualities of the size compositions of the invention since the occurrence of fiber breaks in the strand and yarn packages after forming, twisting, plying and quilling and in fabrics is determined by the success of the size composition in combating mutual abrasion and the chemical degradation of the fibers.

While the primary value of the products of the invention is realized in fiber reinforced plastic structures and matrices, and particularly in structures of this type which require high strength values, the products are useful across the broad spectrum of fibrous glass applications.

For example, the coated glass fibers and strands, yarns, roving tapes, scrim and fabrics formed therefrom may be used in both reinforcing and non-reinforcing applications common to such fibrous glass products. In addition, mats may be formed by chopping the coated strands of the invention and bonding them into a random mat, or the chopped strands may be incorporated in the molding premix. Another application involves molding compounds comprising coated fibers or strands which are either provided with unusually large amounts of the size composition or subsequently impregnated with additional quantities of resin to yield pre-pregs.

The structure of the coated fibers obtained in accordance with Examples 1–4 is illustrated by FIG. 2 which depicts a cross-sectional view of a glass fiber 13 provided with a base coating 14 immediately adjacent to the glass surface and comprising the reaction product of an epoxy resin and an aminosilane, with an external coating of epoxy resin 15 which ranges from an uncured surface 16 to an exterior portion 17, adjacent the base coating 14 which may be partially cured by amino groups of the aminosilane which is present in the base coating 14.

In order to demonstrate the abrasion resistance of the coatings of the invention, and their ability to preserve the inherent strengths of glass fibers, as well as the efficacy of a two step application of the aminosilane and the epoxy resin, succeeding Examples 5–9 have been conducted. In all of the following examples, the forming size was applied by the apparatus depicted in FIG. 1 with the aminosilane being applied by the first applicator 5 while the resin solution was applied by the second applicator 6. In each case the aminosilane comprised hydrolyzed gamma amino propyl triethoxy silane while the resin consisted of a solution of Araldite 6005 epoxy resin in diacetone alcohol.

Example 5

In order to demonstrate the basic strength implementation achieved through the use of the compositions and processes of the present invention, a continuous glass fiber was drawn from a single hole fiber forming bushing at the rate of 4200 feet per minute. One portion of the fiber thus formed was left uncoated while the epoxy aminosilane coating was applied by the technique of the present invention to the balance of the fiber. From the coated portion of the fiber fifty-five short fibers of the same length were cut while fifty-three similar fibers cut from the uncoated segment. These fibers were then subjected to the application of longitudinal force until broken, in order to obtain contrasted frequency of strength measurements of the two types of fibers. The data obtained from this test method is set forth in Table 2.

TABLE 2

| | Number of Fiber Breaks Occurring | |
|---|---|---|
| Force Applied (in 1,000 p.s.i.) | Uncoated | Coated |
| 100–149 | 1 | 0 |
| 150–199 | 4 | 0 |
| 200–249 | 5 | 2 |
| 250–299 | 14 | 3 |
| 300–349 | 15 | 5 |
| 350–399 | 11 | 6 |
| 400–449 | 2 | 10 |
| 450–499 | 1 | 17 |
| 500–550 | 0 | 17 |

It should be noted that the tensile strengths of the uncoated fibers averaged 304,200 pounds per square inch while that of the coated fibers was 453,900, thus reflecting a 49.2 percent strength improvement.

Example 6

This strength increase is further reflected by the data embodied in Table 3 wherein three different runs of glass fibers were pulled at the rate of 4200 feet per minute from a single hole bushing. A portion of each run was coated with an epoxy resin aminosilane coating composition in accordance with the method of the present invention while the remainder was left uncoated. From both the coated and uncoated portions of each run, 40 fibers of the same length were prepared and subjected to longitudinal force until broken. The average of the forces required to break the 40 fibers was then determined to yield the following comparison:

TABLE 3

|  | Force Applied (lbs./sq. in.) | | |
| --- | --- | --- | --- |
|  | Run No. 1 | Run No. 2 | Run No. 3 |
| Coated Fibers | 460,000 | 444,000 | 465,000 |
| Uncoated Fibers | 316,000 | 266,000 | 321,000 |

Example 7

In order to test the abrasion resistance of the coated fibers as compared to that of uncoated glass fibers, a cylinder having a ground glass surface was placed beneath coating apparatus employed in conjunction with a single hole bushing and directly in the line of passage taken by the fiber during drawing and winding. A single glass filament was then drawn over the ground glass surface at the rate of 4200 feet per minute. A portion of the fiber thus drawn was left uncoated while the remainder was provided with an epoxy coating in accordance with the invention. Forty short fibers of equal length were then prepared from both the coated and uncoated portions of the fiber which had been subjected to the described abrasion conductive condition. The fibers were then broken through the application of longitudinal force and the average force required to break the fibers was computed and is set forth in Table 4:

TABLE 4

Force applied (lbs./sq. in.)
Coated fibers _____ 460,000
Uncoated fibers _____ 195,000

Thus it may be seen that immediate protection is provided since the abrasive surface was positioned immediately below the resin applicator with only a fraction of second provided for curing, since the gap between the applicator and the abrasive surface was traversed very quickly by the rapidly moving strands. In addition, strengths paralleling those of treated fibers not subjected to abrasion were maintained while the uncoated exhibited a strength loss in excess of 50 percent. Accordingly, it may be seen that the highly abrasive conditions of the example yielded no perceptible effect upon the inventive fibers.

Example 8

In order to achieve a comparison of the tensile strengths of glass fibers treated according to the methods of the invention, with those sized with materials conventionally employed upon fibers used in reinforced plastics structures, as well as those which are unsized, the following test was devised. A single glass filament was drawn from a single hole bushing and a portion was left uncoated while one segment was coated with a conventional size composition comprising polyvinyl acetate, and the balance was treated according to the present invention. Forty fibers of equal length were selected from each of the different portions and subjected to previously described tensile tests to yield the following data:

TABLE 5

Average tensile strength, p.s.i.
(average of 40 breaks)
Uncoated fibers _____ 400,000
Conventionally sized fibers _____ 380,000
Epoxy coated fibers _____ 460,000

This data indicates that conventional size or coating compositions actually bring about a decrease in fiber strengths as compared to the substantial strength increase achieved with the coatings of the invention. It should be noted that the diminished strengths of the conventionally coated fibers are normally accepted in view of the resin compatibility and abrasion resistance which is provided by such coatings.

Example 9

In addition, since a plurality of fibers grouped into a strand undergo conditions of mutual abrasion not experienced by single glass fibers which are kept from contact with other filaments, the following test was conducted to determine the comparative efficiency of the methods and materials of the present invention in deterring the effects of mutual abrasion. In the conduct of this test, a strand comprising 204 glass filaments was prepared by employing apparatus similar to that depicted in FIG. 1 wherein a guide member 8, positioned beneath the fiber forming bushing and the coating applicators, serves to group the fibers into a strand formation prior to winding. Using this technique, one portion of the strand prepared was left uncoated while a second portion was sized with a conventional polyvinyl acetate size composition and the balance was treated according to the invention. Forty fibers of each type, i.e., uncoated, conventionally sized and epoxy coated, were then separated from the strand thus formed and subjected to the previously described test for tensile strength to yield the following data:

TABLE 6

| Type of strand from which fibers were selected: | Force applied to fibers in lbs./sq. in. (Average of 40 breaks) |
| --- | --- |
| Uncoated | 197,000 |
| Conventionally sized | 278,000 |
| Epoxy coated | 460,000 |

It may be seen that while even greater strength decreases stemming from mutual abrasion, are occasioned among the uncoated and conventionally sized materials when a plurality of glass fibers are grouped into a strand formation, the fibers treated according to the invention are not affected in this respect.

Thus, it is evidenced by the foregoing strength data that highly significant strength increases over uncoated or conventionally sized structures, are realized by treating glass fibers and materials formed from glass fibers with the methods and materials of the present invention.

In addition, through the use of the base materials of the invention, improved highly resin loaded glass fiber structures may be prepared. As previously stated, resin coatings in the range of 10 to 25 percent by weight and preferably in excess of 15 percent by weight are necessary for the preparation of fiber reinforced preforms which may be merely formed into a desired shape or structure and converted to a hard, rigid, or thermoset structure through the application of heat. However, difficulty is encountered in the preparation of such preforms during fiber forming due to inherent processing problems. For example, the high speed of attenuation or drawing employed in the formation of glass fibers normally prohibits the application of resin coatings in excess of 5 percent by weight, since the speed tends to throw the coating materials from the fiber strand and the viscosities of coating materials which are conventionally employed limit the amount of resin pick up which is achieved. In addition, if the resinous forming size applied to the fibers at forming and comprising less than 5 percent by weight of the composite structure, is completely cured, the subsequent impregnation of the structure with additional resin, e.g. a B-staged resin, is rendered extremely difficult due to the tendency of the cured surface to resist wetting out by the superimposed coating. Difficulty in attaining wet out is the result of both the slowness of superimposed resins in wetting out a cured resin surface and their inability to achieve a complete wetting out. As a result, products characterized by structural weaknesses or defects are obtained. With the methods of the invention, wetting out is both rapid and substantially complete.

These hazards are avoided by the present invention, and a highly loaded fiber reinforced resin preform or pre-preg is rendered possible. To achieve such a preform, a glass fiber reinforcing structure is provided with the inventive size coating of an epoxy resin and a polar organo silane which comprises 0.5 to 5 percent by weight of the composite glass-resin structure. Such a preform may then be "pre-pregged" with additional quantities of epoxy resin which contains a curing agent, to provide a material which may be shaped to a desired form and converted to a reinforced thermoset structure by means of the curing of the subsequently applied resin, e.g. by the application of heat.

A cross section of an element of the described molding preform or pre-preg is provided by FIG. 3 in which an additional quantity of resin 18, is applied to and thoroughly wets out the uncured surface 16, of the first resin coating 15. The exterior resin coating 18, comprises the same thermosetting resin utilized in the first coating 15, and also contains a heat activatable hardener or curing agent for the resin 18, while the first resin 15 does not contain a hardener and is cured only at the interface 17, of the first resin coating 15, and the surface of the glass fiber 13. Prior to the application of heat, the exterior resin coating 18 remains in an uncured condition. The element depicted in FIG. 3 is a fibrous strand which may be directly employed in this form in the preform or may be fabricated into a roving, tape, fabric or the like. For purposes of illustration, FIG. 3 represents a strand structure comprising seven coated fibers, which was arbitrarily selected to conform to the number of fiber forming bushing tips 3 which are depicted in FIG. 1. However, it must be realized that the coated fibrous preforms may comprise a variety of types of elongate strands containing a single or plural impregnated fibers as well as other nondepicted forms which comprise non-strand like forms such as tapes or fabrics prepared from fiber or strand based materials.

The highly loaded preforms of the invention may be used in the form of single filaments, as strands, yarns or rovings, or as fabrics prepared from the aforementioned materials. Particularly useful are rovings which comprise a plurality of strands in a generally parallel relationship or spun rovings as are disclosed by U.S. 2,719,350, 2,719,352, and 2,719,926.

In one application, single glass fibers treated in accordance with the invention with an epoxy aminosilane coating amounting to 18 percent by weight, i.e. forming size and subsequent coating of epoxy resin and curing agent, were wound in a parallel fashion about a metal drum. Upon the application of heat, the wound structure was converted into a tough, rigid plastic cylinder containing glass fiber reinforcements. The same technique may be employed with strands, yarns or rovings or with fabrics formed from these materials. Such structures are readily adaptable to conventional molding or forming techniques such as winding or laying up and provide an easily manageable resin possessing an integral fibrous glass reinforcement. The materials may be shaped into the desired structure without resort to additional impregnation or the difficulties of wetting out cured resins with additional resinous material, and readily converted to a heat cured form. In addition to filaments, strands, yarns and rovings which may be shaped into structures by winding or the like, fabrics prepared from these materials may be placed in a mold in the same fashion in which glass fabric preforms are presently utilized and subjected to heat and pressure without the necessity for resin addition, or may be used in lay-up methods wherein the treated fibers are placed upon a frame or core and set by heating.

The above described procedure of testing individual coated filaments for strength is tedious and time consuming. It has been found that the strength of the coated fibers can be determined more easily by a test developed by the Naval Ordinance Laboratory and which procedure is specified by the Naval Ordinance Specification WS1126A. According to this procedure, a strand of glass fibers, the individual fibers of which have been previously coated with the coating materials of the present invention, is wound upon a drum at a lead angle less than 3 degrees between two side plates to give coils that are generally in side by side touching engagement. The strand is usually taken from a forming package, and is coated with an additional epoxy resin containing a curing agent before it is wrapped upon the drum. The epoxy coated strand is wound into a cylinder having a thickness of between approximately 0.240 and 0.260 inch. The drum having the coated strand wound thereon is placed in an oven at 200° F. until the drum reaches a temperature of approximately 192° F. following which the temperature of the oven is raised to 350° F. for approximately one hour or until the drum temperature reaches 342° F. Thereafter, the drum having the wound material thereon is left in the oven for a two hour period, following which it is removed from the oven and allowed to cool to room temperature.

The cured cylinder of epoxy bonded coiled strand of glass fibers is then mounted in a lathe, and the outside diameter of the cylinder is machined to provide a thickness of bonded glass fibers of approximately 0.063 inch. The cylinder of bonded glass fibers so produced is then cut into widths of between 0.240 and 0.260 inch to provide what is known as NOL rings. These rings are tested by inserting a ring over two hemicylinders which are pulled apart by a suitable tensile testing machine. The hemicylinders hold the ring in a generally cylindrical shape so that the sections of the ring on opposite sides of the parting surfaces of the hemicylinders is placed in tension. The hemicylinders are moved apart at a uniform rate and the maximum load required to break the ring is recorded. The maximum force required to burst the ring is, of course, a function of the strength of the glass fiber and will vary with the number of coils in the ring. Because a uniform winding procedure is used in making the cylinders from which the rings are made, the force required to burst the ring, when translated into pounds per square inch of cross section, can be used to compare the strength of glass fibers and coating materials.

After failure, the test specimens are placed in an oven and the resin binder is burned off to determine the percentage of glass which existed in the NOL ring. By adjusting the bursting pressure of the NOL ring by a factor depending upon the percent of ignition loss, an adjusted tensile strength is determined which is indicative of the strength of the fibers forming the NOL ring. Because the NOL rings are but a section of the cylinder from which they are made, the coils which make up the NOL rings are not continuous. The tensile strength as determined by the NOL ring test is considerably lower than the true tensile strength of the glass fibers themselves, and is dependent upon the force transferred from one fiber to another through the resin material. The strength reported by the test is therefore also a measure of the strength of the bond which is achieved between the resin and the glass fibers. In addition to producing glass fibers having close to the theoretical strength of glass, the present invention is characterized by its uniform coating of the fibers which maintains separation of the fibers. The uniform coating is observed as an increase in bond strength between the resin and the fiber, which when other things are equal, can be used as an indication of the tensile strength of the glass fibers.

The following example is given by way of control so that NOL ring test results may be compared with the more tediously obtained tensile strength data of individual filaments given above.

Example 10

An NOL ring was made from glass strands coated with the material of Example 4 and using the procedure given above. A strand containing 204 filaments coated with the resin of Example 4 was unwound from the coiled forming package of the thus coated glass fibers, and was coated with an epoxy laminating resin and wound upon a ring mold forming durm as described above. The laminating resin which was applied to the coated glass fibers of Example 4 comprised the following materials.

| Material: | Parts by weight |
|---|---|
| Epoxy resin, Epon 828 | 50 |
| Epoxy resin, Epon 1031 | 50 |
| Curing agent (nadic methyl anhydride) | 90 |
| Accelerator (benzol dimethyl amine) | 0.55 |

Epon 828 has the following formula:

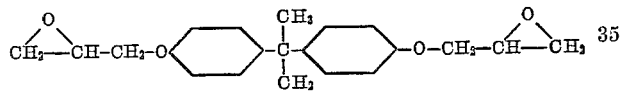

Epon 1031 has the following formula:

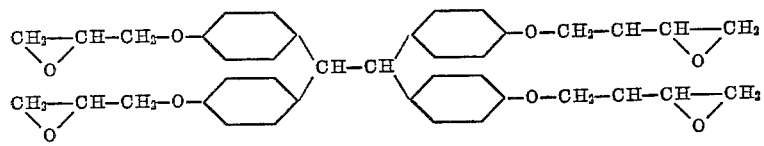

The ring molds made according to the procedure above described was thereafter tested and the result is given in Table 7.

Example 13

| | |
|---|---|
| Epoxy resin (Unox 207)[1] decyclopentadiene dioxide | 13 |
| Glycidoxy propyltrimethoxy silane | 0.7 |
| Diacetone alcohol | 86.3 |

[1] Unox 207 has the following formula:

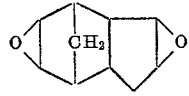

Example 14

| | |
|---|---|
| Epoxy resin (DER 661)[2] | 13 |
| Glycidoxy propyltrimethoxy silane | 0.7 |
| Diacetone alcohol | 86.3 |

[2] DER 661 resin has the following formula:

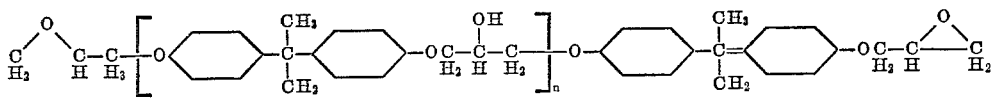

where $n$=approximately 2 ave. and E.E.W.= approx. 475–550.

Example 15

| | Percent |
|---|---|
| Epoxy resin (DER 661) | 13 |
| Glycidoxy propyltrimethox silane | 0.7 |
| Diacetone alcohol | 86.0 |
| Silicone lubricant (Y 4186)[1] | 0.3 |

[1] Lubricant Y 4186 has the following formula:

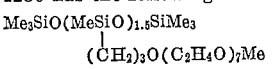

TABLE 7

| Property | Examples | | | | | | |
|---|---|---|---|---|---|---|---|
| | 10 | 11 | 12 | 13 | 14 | 15 | 16 |
| Sheer | 10,500 | 10,800 | 10,900 | 11,600 | 10,900 | 10,900 | 10,000 |
| Calculated glass fiber stress | 334,000 | 310,000 | 312,000 | 307,000 | 334,000 | 334,000 | 330,000 |

The following examples demonstrate the practice of the invention using organosilanes having other functional radicals thereon which are reacted with the oxirane rings of an epoxy resin, as well as various epoxy resins, and solvents therefore.

Example 11

| | Percent |
|---|---|
| Epoxy resin (Araldite 6005) | 10 |
| Glycidoxy propyltrimethoxy silane | 0.66 |
| Diacetone alcohol | 89.33 |

Example 12

| | |
|---|---|
| Epoxy resin (Araldite 6005) | 13 |
| Glycidoxy propyltrimethoxy silane | 0.7 |
| Diacetone alcohol | 86.3 |

Example 16

| | |
|---|---|
| Epox resin (DER 661) | 13 |
| Beta (3,4 - epoxycyclohexyl) - ethyltrimethoxy silane[2] | 0.7 |
| Diacetone alcohol | 86.3 |

[2] 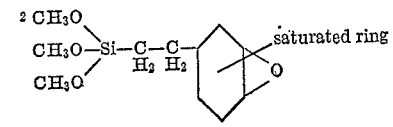

Example 17

| | |
|---|---|
| Epoxy resin (DER 661) | 13 |
| Glycidoxy propyltrimethoxy silane | 0.7 |
| Methyl ethyl ketone | 86.3 |

Example 18

| | |
|---|---|
| Epoxy resin (DER 661) | 13 |
| Glycidoxy propyltrimethoxy silane | 0.7 |
| 50% acetone-50% toluene mixture | 86.3 |

Example 19

| | |
|---|---|
| Epoxy resin (DER 661) | 7 |
| Epoxy resin (DER 330)[3] | 3.2 |
| Glycidoxy propyltrimethoxy silane | 0.67 |
| Y-4186 Lubricant | 0.42 |
| Diacetone alcohol | Balance |

[3] DER 330 is a generally unpolymerized diglycidyl ether of bisphenol-A having an E.E.W. of 180–188 and diluted by 12 percent butyl glycidyl ether.

The following is an aging type of size having good processing characteristics.

Example 20

| | Percent |
|---|---|
| Epoxy resin (DER 330) | 10 |
| Epoxy resin (DER 660)[4] | 3 |
| Gamma amino propyltriethoxy silane | 0.75 |
| Cocoamine acetate | 0.75 |
| Diacetone alcohol | Remainder |

[4] DER 660 is a poly diglycidyl ether of bisphenol-A similar to DER 661 but having an E.E.W. of approximately 425–475.

NOL test rings were made using each of the above materials and the same procedure as given in Example 10. These rings were ignited to determine the glass loading of the rings, and an NOL strength was determined, all as given in Table 7. The materials of Examples 17–20 each have a calculated fiber strength of approximately 330,000 p.s.i.

It has been found that laminates which contain the organosilanes and solvents of Examples 11–19 and which are devoid of amine nitrogen will provide longer pot life than those of Examples 1–4. The strengths of the fibers which are produced using these organosilanes and polar solvents and which are devoid of amine nitrogen are therefore in some instances to be preferred and the strength of each is generally equivalent to that of the materials of Examples 1–4. Lubricants which are devoid of amino nitrogen are also preferred, and as previously stated, silicone lubricants which are generally devoid of hydroxyl groups or hydrolyzable groups can be used. The silicone lubricant used above in Example 15 is representative of the preferred lubricant materials.

It will be apparent that the objects heretofore enumerated as well as others have been accomplished and that there has been provided a method and materials for producing glass fibers having strength substantially equal to the theoretical strength of glass.

While the invention has been described in considerable detail, I do not wish to be limited to the particular embodiments shown and described and it is my intention to cover hereby all novel adaptations, modifications, and arrangements thereof which come within the practice of those skilled in the art.

I claim:

1. A method for sizing glass fibers at forming consisting essentially of: Attenuating molten streams of glass into fibers, preparing an organic solution devoid of free water of a polar organic solvent and a polar organosilane of the general formula $R_4Si$ wherein at least one R is polar organo group having a functional radical from the group consisting of: oxirane rings and curing agents for oxirane rings; and the remaining R's are selected from the group consisting of hydroxyl radicals and hydrolyzable radicals; coating the surfaces of said fibers immediately after attenuation with said solution; causing said coating of organic solution to include a reactable epoxy resin in an amount greater than that which can be completely reacted with the polar organo radicals of said polar organosilane; and collecting the coated fibers for subsequent use with unreacted epoxy resin being exteriorly adjacent to the organosilane molecules.

2. A method as claimed in claim 1 in which said polar organosilane and said epoxy resin are applied to said surfaces as an intimate mixture.

3. A method as claimed in claim 1 in which said solvent is a diacetone alcohol.

4. A method as claimed in claim 3 in which said polar organosilane and said epoxy resin are applied to said surfaces as an intimate mixture.

5. A method as claimed in claim 1 in which said polar organosilane has hydrolyzable groups and is dissolved in diacetone alcohol and then hydrolyzed before being applied to the fibers.

6. The method as claimed in claim 1 wherein said organic solution consists essentially of the following approximate percentages by weight of:

| | Percent |
|---|---|
| Diglycidyl ether of Bisphenol A | 10 |
| Polymer of diglycidyl ether of Bisphenol A having an E.E.W. of approximately 425–475 | 3 |
| Gamma amino propyltriethoxy silane | 0.75 |
| Cocoamine acetate | 0.75 |
| Diacetone alcohol | Remainder |

7. The method as claimed in claim 1 wherein said organic solution consists essentially of the following approximate percentages by weight of:

| | Percent |
|---|---|
| Polymer of diglycidyl ether of Bisphenol A having an E.E.W. of approximately 425–475 | 7 |
| Diglycidyl ether of Bisphenol A | 3.2 |
| Glycidoxy propyltrimethoxy silane | 0.67 |
| Lubricant | 0.42 |
| Diacetone alcohol | Balance |

8. A method for the preparation of structures reinforced by glass fibers and consisting essentially of: preparing an organic solution devoid of free water of a polar organic solvent and a polar organosilane having the general formula $R_4Si$ wherein at least one R is a polar organo group having a functional radical from the group consisting of oxirane rings and curing agents for oxirane rings, and the remaining R's are selected from the group consisting of hydroxy radicals and hydrolyzable radicals; coating the surfaces of said fibers immediately after attenuation with said solution; causing said coating of organic solution to include an uncatalyzed reactable epoxy resin in an amount greater than that which can be completely reacted with the polar organo radicals of said polar organosilane; winding the coated fibers into a coiled package; uncoiling the fibers from the package; impregnating the coated fibers with an admixture of an epoxy resin and an epoxy curing agent; and reacting said impregnating materials with said coating materials in situ.

9. A method as claimed in claim 8 in which said polar organosilane has hydrolyzable groups and is dissolved in the polar organic solvent and then hydrolyzed before being applied to said surfaces.

10. A glass fiber reinforced structure produced in accordance with the method of claim 8.

11. Glass fibers having a coating that is devoid of free water and which consists essentially of: a polar organosilane having the general formula $R_4Si$ wherein at least one R is a polar organo group having a functional radical from the group consisting of oxirane rings and curing agents for oxirane rings, and the remaining R's are selected from the group consisting of hydrolyzable radicals and hydroxyl radicals, the molecules of said organosilane having their silane portion oriented to the glass and their polar organo radical portion projecting from the surface of the glass and solvated by molecules of a reactable epoxy resin in an uncured state, said molecules of epoxy resin being in an amount greater than that which can be completely reacted with the polar organo radicals of said polar organosilane.

12. The glass fibers of claim 11 in which said polar organo solvent is diacetone alcohol.

13. The glass fibers of claim 11 in which said polar organosilane is an aminoalkyl silane.

14. A method for sizing glass fibers at forming consisting essentially of: preparing an organic solution devoid of free water of an amino silane of the general formula $R_4Si$ wherein at least one R is an amino alkyl radical and the remaining R's are selected from the group consisting of alkoxy, halogen, and hydroxyl radicals; coating the surfaces of said fibers during their formation with said solution; causing said coating of organic solution to include a reactable epoxy resin in an amount greater than that which can be completely reacted with the amino groups of said aminoalkylsilane; reacting said aminoalkylsilane and epoxy resin in such manner as to leave free unreacted epoxy resin and winding the coated fibers into a coiled package with unreacted epoxy resin exteriorially adjacent to the organosilane molecules.

15. A method as claimed in claim 14 in which said aminoalkylsilane and said epoxy resin are concurrently applied to said surfaces.

16. A method as claimed in claim 14 in which said solvent is diacetone alcohol.

17. A method as claimed in claim 16 in which said aminoalkylsilane and said epoxy resin are concurrently applied to said surfaces.

18. A method as claimed in claim 14 in which said aminoalkylsilane has hydrolyzable groups and is dissolved in diacetone alcohol and then hydrolyzed before being applied to the fibers.

19. A method for the preparation of structures reinforced by glass fibers and consisting essentially of: preparing an organic solution devoid of free water of an aminoalkylsilane having the general formula $R_4Si$ wherein at least one R is an amino alkyl radical and the remaining R's are selected from the group consisting of alkoxy, halogen, and hydroxy radicals; coating the surfaces of said fibers during their formation with said solution; causing said coating of organic solution to include an uncatalyzed reactable epoxy resin in an amount greater than that which can be completely reacted with the amino groups of said aminoalkylsilane; reacting said aminoalkylsilane and epoxy resin in such manner as to leave free unreacted epoxy resin; winding the coated fibers into a coiled package; uncoiling the fibers from the package; impregnating the coated fibers with an admixture of an epoxy resin and an epoxy curing agent; and further reacting free epoxy groups of said coating and impregnating materials in situ.

20. A method as claimed in claim 19 in which said aminoalkylsilane has hydrolyzable groups and is dissolved in diacetone alcohol and then hydrolyzed before being applied to said surfaces.

21. Glass fibers having a coating that is devoid of free water and which consists essentially of: an aminoalkylsilane the molecules of which have their silane portion oriented to the glass and the amino portion thereof projecting from the surface of the glass and in the presence of an organic solvent from the group consisting of diacetone alcohol, acetone, methyl isobutyl ketone, trichloroethane, alkyl ethers of ethylene glycol, and ethylene glycol monobutyl ether acetate, said solvent containing molecules of an epoxy resin in an amount greater than can attach directly to the silane molecules, and at least some molecules of epoxy resin being in an uncured state.

22. The glass fibers of claim 21 in which said organic solvent is diacetone alcohol.

23. A method for the protection of glass fibers, said method consisting essentially of: preparing an organic solution devoid of free water of a polar organic solvent and a polar organosilane of the general formula $R_4Si$ wherein at least one R is a polar organo group having a functional radical from the group consisting of oxirane rings and groups reactive with curing agents from oxirane rings, and the remaining R's are selected from the group consisting of hydroxyl radicals and hydrolyzable radicals; producing a coating on said fibers that includes said solution and reactable epoxy resin in an amount greater than that which can be completely reacted with the polar organo radicals of said polar organosilane; and curing said coated fibers to bond said epoxy resin to said glass through said organosilane.

24. The method of claim 23 wherein said organosilane is an amino silane.

25. The method of claim 23 wherein said organosilane is a glycidoxy silane.

References Cited

UNITED STATES PATENTS

| | | | |
|---|---|---|---|
| 2,843,560 | 7/1958 | Mika | 117—126 |
| 2,931,739 | 4/1960 | Marzocchi et al. | 117—126 |
| 2,974,062 | 3/1961 | Collier | 117—126 |
| 3,169,884 | 2/1965 | Marzocchi et al. | 117—126 |

WILLIAM D. MARTIN, Primary Examiner

D. COHEN, Assistant Examiner

U.S. Cl. X.R.

65—3; 117—72, 76, 126